（12）United States Patent
Singhal et al.

(10) Patent No.: US 7,587,762 B2
(45) Date of Patent: Sep. 8, 2009

(54) INTRUSION DETECTION SYSTEM AND NETWORK FLOW DIRECTOR METHOD

(75) Inventors: Anil Singhal, Carlisle, MA (US); Dionisio Lobo, Lowell, MA (US)

(73) Assignee: NetScout Systems, Inc., Westford, MA (US)

( * ) Notice: Subject to any disclaimer, the term of this patent is extended or adjusted under 35 U.S.C. 154(b) by 622 days.

(21) Appl. No.: 10/637,431

(22) Filed: Aug. 8, 2003

(65) Prior Publication Data

US 2004/0034800 A1     Feb. 19, 2004

Related U.S. Application Data

(60) Provisional application No. 60/402,255, filed on Aug. 9, 2002.

(51) Int. Cl.
*G06F 7/04*      (2006.01)
*G06F 11/30*    (2006.01)

(52) U.S. Cl. ......................................... 726/23; 709/224

(58) Field of Classification Search .................... 726/23
See application file for complete search history.

(56) References Cited

U.S. PATENT DOCUMENTS 5,796,942 A * 8/1998 Esbensen .................... 726/13
5,991,881 A * 11/1999 Conklin et al. ................ 726/22
6,772,349 B1 * 8/2004 Martin et al. ................. 726/22
7,017,186 B2 * 3/2006 Day ............................. 726/23
7,159,237 B2 * 1/2007 Schneier et al. ............... 726/3
2002/0083344 A1 6/2002 Vairavan ..................... 713/201
2002/0087882 A1 7/2002 Schneier et al. ............. 713/201
2003/0084349 A1 * 5/2003 Friedrichs et al. .......... 713/201

OTHER PUBLICATIONS

Waldbusser, S., RFC2819 "Remote Network Monitoring Management Information Base"; May 2000.*
Waldbusser, S., RFC 2021 "Remote Network Monitoring Management Information Base"; Jan. 1997.*
International Search Report for International Patent Application No. PCT/US03/24749, dated Aug. 8, 2003, 4 pages.
Erhard et al., "Network Traffic Analysis and Security Monitoring with UniMon," *Proceedings of the IEEE Conference 2000 on High Performance Switching and Routing*, 2000: 439-446.

* cited by examiner

*Primary Examiner*—Jung Kim
(74) *Attorney, Agent, or Firm*—Finnegan, Henderson, Farabow, Garrett & Dunner, L.L.P.

(57) ABSTRACT

A system and related methods are disclosed for detecting the occurrence of an intrusion attack. A network device, such a probe, monitors traffic on a first network and converts the traffic to a format that is suitable for transmission on a second network. The converted traffic is forwarded to an intrusion detection system for further processing. Prior to transmission, the converted data may be filtered to remove data that is not useful in detecting an intrusion attack.

41 Claims, 6 Drawing Sheets

| LANE HEADER 200 | NATIVE ETHERNET DESTINATION ADDRESS 201 | NATIVE ETHERNET SOURCE ADDRESS 202 | ETHERTYPE 203 | DATA PAYLOAD 204 | CRC32 205 |

FIG. 6A

| 00-80-8C-55-55-55 210 | 00-80-8C-AA-AA-AA 211 | ETHERTYPE 203 | DATA PAYLOAD 204 | CRC32 (NEW) 205 |

FIG. 6B

INTRUSION DETECTION SYSTEM AND NETWORK FLOW DIRECTOR METHOD

CROSS-REFERENCE TO RELATED APPLICATION

This application claims priority to and the benefit of, and incorporates herein by reference, in its entirety, U.S. provisional patent application Ser. No. 60/402,255, filed Aug. 9, 2002.

FIELD OF THE INVENTION

The invention relates generally to computer networks and more specifically to network performance data collection/conversion and filtering for intrusion detection.

BACKGROUND OF THE INVENTION

An organization's local area networks (LANs) typically communicate with a wide area network (WAN), such as the Internet. Such connections to WANs, which are typically outside the enterprise, leave the LANs vulnerable to intrusion attack.

An Intrusion Detection System (IDS) allows detection of an actual or attempted unauthorized access into an organization's computer network. Even though existing IDSs are very useful in intrusion detection, they generally suffer from false positives (i.e. generating an alert when there is really none) and false negatives (i.e. failing to generate an alert even though an intrusion is underway). In addition, IDS systems frequently do not provide capability for forensic analysis once an attack is detected.

Intrusion attacks typically originate from outside an organization's network, in that they are directed into an organization's network via its "connection" to the outside world—which is typically the WAN interface. However, since existing IDSs are typically located on a LAN, the IDS typically sees a mixture of internal traffic, which is generally safe, and external traffic, which potentially contains intrusion attacks. Due to IDS limitations, there are circumstances when benign, internal traffic can sometimes be wrongly interpreted by an IDS to be an intrusion attack, thereby resulting in a false positive.

IDSs have to process a large amount of traffic in order to uncover intrusion attacks. However, due to performance limitations, they are likely to drop some traffic. There is a reasonable probability that this "dropped traffic" contains valuable, intrusion-related information that would have caused the IDS to issue an alert. Hence, due performance limitations, an IDS could potentially generate a false negative even while an intrusion is underway.

Existing IDSs are primarily focused in flagging attacks. Some IDSs provide event logs that give a limited historical view of the events that triggered an alert.

SUMMARY OF THE INVENTION

The present invention provides a system and method for detecting network intrusions while minimizing the number of false detections and missed detections. The context of the network traffic is preserved during a detected intrusion, thereby facilitating further tracing and analysis.

If an IDS generates large amount of false positives and/or negatives, user confidence in the IDS will be low. Hence, there is a need to reduce the number of false positives/negatives that an IDS generates. In addition, intruders are innovative and are always attempting new schemes to outwit IDSs. Hence, it is important that a security analyst be provided with additional data points that can improve interpretation of events flagged by the IDS and can provide information that will allow an analyst to uncover intrusions that the IDS would otherwise fail to detect. Hence, there is a need to supplement existing IDSs in several ways.

The utility of existing IDSs can be improved by combining the IDSs with certain functionality, which can be provided by Network Performance Probes now used for the management and monitoring of networks. Network Performance Probes—such as the NETSCOUT NGENIUS family of Probes—are available for monitoring many different network topologies (both LAN and WAN) and provide information such as statistics related to protocols, hosts, and conversations, response time measurements, QoS-monitoring, historical trending of network traffic, and so on. By making use of already-existing probe features and by adding new functionality specific to intrusion detection, the combination of an enhanced network probe and an IDS will result in a greatly improved intrusion detection system.

In one implementation, IDS functionality is added to an existing network probe. The probe converts WAN traffic into an Ethernet format traffic that an existing IDS can monitor. Including the IDS-support functionality within the probe enables an IDS to see only WAN traffic. Hence, false positives arising from wrongly interpreting (benign) LAN traffic are eliminated. Furthermore, WANs are generally slower than LANs; so the IDS is now exposed to a reduced amount of traffic. False negatives resulting from performance shortcomings of an IDS are therefore minimized.

In general, in one aspect, the invention relates to a network performance probe configured to forward packets monitored on a network link to an IDS. The network performance probe monitors a first network link using a first network interface. This first network link can be any type of network link, so long as the probe is capable of monitoring it. Some network performance probes can be configured to monitor many different types of network links, for example HSSI, T1/E1, ATM, Frame-DS3, Packet-over-Sonet/SDH, 10G Ethernet, and encapsulated traffic such as MPLS, VLANs (e.g., 802.1q) etc. In one preferred embodiment, the first network link is the part of the network associated with a WAN or aggregated LAN links (for example those used in "trunking" applications). This LAN/WAN link is frequently a desirable location for network performance monitoring and is also typically a useful point for intrusion detection.

In addition to communicating with the first network link, the network performance probe also communicates with a second network link via a second network interface. In a preferred embodiment, an IDS is installed on the second network link. In one such embodiment, the second network link is a LAN, so that a commercially available IDS configured for communication over a LAN can be used in combination with the network performance probe.

The network performance probe converts packets monitored on the first network link into a format suitable for the second network link. The probe transmits the converted packets over the second network link, thereby allowing the packets to be monitored by an IDS in communication with the second network link. The conversion process includes storing received packets in a collection buffer, stripping header (and optionally checksum) information associated with a protocol of the first network link, and adding header (and optionally checksum) information associated with a protocol of the second network link. The conversion process is user-configurable. For example, the user can specify that no conversion needs to be done for frames that have either MPLS or VLAN tags.

In some embodiments, the probe can aggregate packets from additional network links (in addition to the first network link), for example, from a third and/or fourth network link and so on, so that the probe relays packets monitored on the first and the additional network link(s) over the second network link. This allows the combined packets from two or more network links to be monitored by the IDS. This is also particularly useful for network links which are implemented with multiple network connections. For example, if a link is formed of two network connections between point A and point B, the two network connections can be monitored and aggregated by the probe and the packets made available for intrusion detection. Likewise, three or more links can be aggregated.

In general, the probe can function in concert with the IDS while continuing to engage in network performance analysis functions. The intrusion detection functionality is provided without significant degradation in the operation of the probe. In one embodiment, this is accomplished by the addition of hardware to the probe, in the form of a plug-in card, referred to as the "Network Security Adapter," which operates in parallel with network performance hardware. This plug-in card can take the place of a network interface card which the probe may already be configured to accept.

In some embodiments, the probe also includes a filter, which filters packets on the first network link (and, if present, additional aggregated network links) before relaying the packets to the IDS via the second network link. The probe can be configured to filter packets that are not likely to be useful for intrusion detection. Management information, for example, can be filtered out if it will not be used by the IDS. As a specific example, if the first network (and any optional additional network links) is an ATM network, control or management traffic data such as F4 OAM Cells, F5 OAM Cells, Flow Control (e.g., RM Cell), UNI 3.x, and UNI 4.0 signaling frames will be automatically be filtered. This will reduce the amount of traffic that an IDS has to process, thereby further reducing the likelihood of false negatives.

In one implementation, the probe maintains an audit trail buffer, also referred to as a log, of network traffic. This audit trail buffer stores network traffic (either filtered or unfiltered) for a predetermined amount of traffic or time interval. Newer traffic replaces old, such that the buffer always contains a record of recent network traffic. Upon request, for example upon the detection of an intrusion event, the probe can provide the log contents to the IDS or other tool for use in forensic analysis. Optionally, the audit trail buffer can be directed to an external permanent storage media in an appropriate format (file system) so that a 24×7 Network Surveillance and Correlation can be performed. In this mode, the Network Security Adaptor (described above) operates as a Network Flow Director since it converts and directs the incoming traffic flow (that is being monitored) into an external permanent storage media. Once the information is externally stored, the user can replay the data at an given point in time (in the past) to correlate Intrusion Attacks or any other event that would be interesting to a Network Administrator. The stored data will be saved in appropriate file formats so that the replay can done either using existing Network Management Applications (such as NETSCOUT's nGenius Performance Manager) or by using application-specific replay devices. For example, if the stored traffic contain Voice-over-IP traffic, then an external Application (Voice-over-IP Media Player) can be used to replay the audio/video portion of the traffic that is stored on the permanent storage media.

The invention also generally relates to a system for enhanced intrusion detection that includes a probe implementing features described above. The probe includes a first network interface for monitoring packets communicated over the first network link, a second network interface for communicating over the second network link, and additional interfaces, as necessary, for any optional additional network links. The probe includes a packet converter for converting the monitored data packets into a format suitable for the second network link.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 6A is a graphical representation of an ATM frame in accordance with an embodiment of the invention; and FIG. 6B is a graphical representation of a converted frame of FIG. 6A in accordance with an embodiment of the invention.

DETAILED DESCRIPTION

Figure 1:
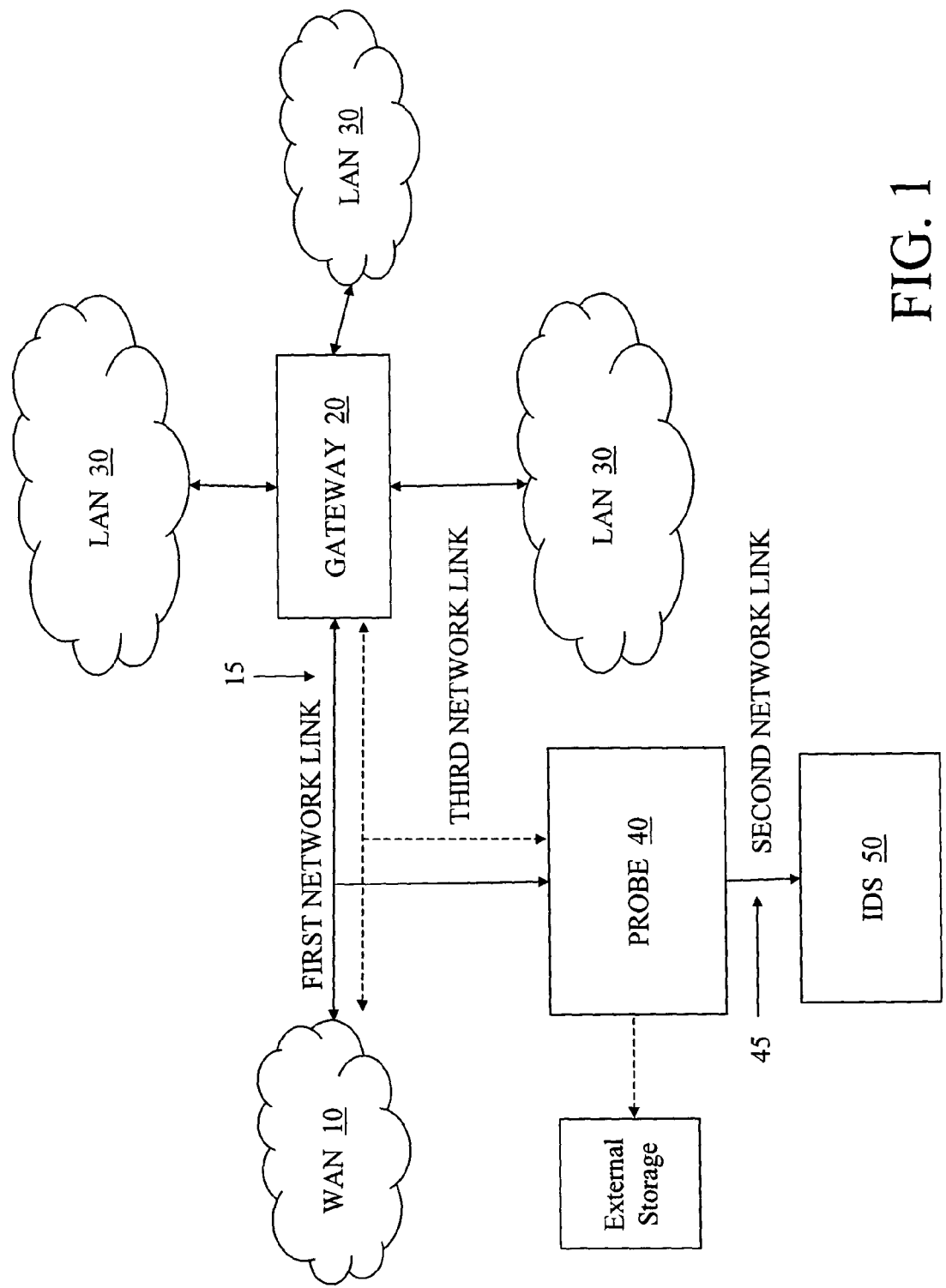
FIG. 1 a graphical presentation of a probe in communication with an IDS system device in accordance with an embodiment of the invention.

As shown in the drawings for the purposes of illustration, the invention may be embodied in a system and method for network intrusion detection that receive, convert, and filter data packets. The data packets are monitored to ascertain network performance. Performance outside of expected norms can be indicative of an intrusion, and a system according to the invention preserves the associated network traffic and context for further analysis.

With reference to the exemplary embodiment illustrated in FIG. 1, a WAN 10 is in communication over a LAN/WAN link 15 with a gateway 20 that connects one or more LAN segments 30. The WAN 10 can be a public or private wide area network, and in one embodiment the WAN 10 is part of or connected to the Internet. The LAN/WAN link 15, for example, can include (but is not limited to) network topologies such as HSSI, T1/E1, ATM, Frame-DS3, Packet-over-Sonet/SDH, 10G Ethernet, ATM/POS OC-192, and encapsulated traffic such as MPLS. The gateway 20 can be a firewall or a router, for example, or some combination. The gateway 20 can route packets between networks 10, 30, as shown, or can in other embodiments connect to other gateways, firewalls, routers, and so on that provide connectivity and security among various networks.

A probe 40 is installed on the LAN/WAN link 15. The probe is preferably a network performance probe, such as the NETSCOUT NGENIUS probe, but the probe can be any sort of device that can perform the capabilities described herein. The probe 40 monitors network traffic on the LAN/WAN link 15 flowing to and from the gateway 20. Data captured by the probe is typically used to monitor the status and performance of the network. The probe collects pertinent information from monitored packets (which are also referred to as frames) and collates this information into tables commonly called a Management Information Base (MIB). For example, the probe 40 can capture data related specified by the industry standard IETF RMON1 MIB (IETF RFC 1757) and RMON2 MIB (IETF RFC 2021) as well as special MIBs (e.g. those design to track Application Response Time Measurements, QoS Measurements). The probe 40 allows the MIB information to be retrieved by an application that has the authorization to do so. A typical probe, for example, will receive a packet and take certain actions, which actions could depend on the characteristics of the packet. A probe will typically collect statistics relevant to low and higher network layers. At a low level, for example, the data link layer, the probe might collect statistics about the utilization about the monitored network link, identify the source and destination of the packet, capture the packet and copy into a buffer for detailed analysis. The probe might also parse the packet to identify the network and application layer protocols embedded in the packet, and collect the relevant network layer addresses to identify the original source and ultimate destination for the packet. The type of operations that the probe performs can depend on the information the system operator would like to obtain from the probe.

In one implementation, the probe 40 is a real-time, embedded system having one or more processors. The internal architecture is based on the Intel 80×86 architecture and as such using PCI-X/PCI-class bus for internal, peripheral communications. The processor(s) are Intel-class CPUs such as the Intel Xeon/Celeron/Pentium running at 1 GHz or faster speeds. The probe 40 also includes memory—both cache memory and DRAM. The processor executes a real-time operating system and controls the functionality of the probe described below.

A probe can contain one or more appropriate network interface cards (NICs) to make it suitable for a specific network topology. Each NIC can provide an interface to one or more network links. There can be multiple NICs in a system. For example, if multiple LAN/WAN links are monitored by a single probe 40, a NIC for each LAN/WAN link may be connected to or otherwise integrated into the motherboard. Other links (e.g., LAN, WAN) can also have associated network interface cards. Each NIC card communicates data to and from the processor via one of the data busses on the motherboard.

In addition to capturing and analyzing network traffic, the probe 40 translates the data monitored on the LAN/WAN link 15 into a format that is usable by an IDS 50. After translation, data monitored by the probe 40 is forwarded to an IDS 50 over the second network 45. Such monitored data, in some implementations, can be filtered and processed before communication to the IDS 50. For example, the IDS 50 may be configured to only receive data in standard Ethernet format (e.g. according to a format specified in IEEE 802.3). As such, the probe 40 translates the data from the LAN/WAN link format into the Ethernet format. After the probe 40 converts the data, additional filtering of the data can be performed. The filtering can remove management and other network traffic that is not useful to the IDS in determining whether or not an intrusion attack is underway.

The IDS 50 can be any sort of intrusion detection system. Typically, such a system 50 is a software application program running on a server-class computer with an operating system such as Windows NT or Linux. The IDS 50 could alternatively be a special purpose device, or a combination of hardware and software. Commercially available IDS systems 50 typically have a limited number of networks on which they are capable of running, and many are only configured to run on Ethernet-type networks. Although this is not a limitation on the invention, the system and method described here are particularly well suited for IDS solutions in which the manufacturer has focused on the software logic capabilities of the IDS 50, and not on providing hardware-based capabilities. The capabilities of the probe 40 and the IDS 50 are especially compatible in such cases.

The second network 45 can be any sort of network, and typically will be designed as the type of network on which the IDS 50 will perform most efficiently. For example, if the IDS 50 is only configured to operate on Ethernet, the second network 45 can be an Ethernet network. The second network 45 can be a link only between the probe 40 and the IDS 50, and this will allow for the full use of the network bandwidth for the purposes described here. The probe 40 and the IDS 50 can use the second network for communication other than the relaying of network traffic. Optionally, there can be another network link (not shown) that connects the probe 40 and the IDS 50 so that they can communicate other information. For example, the IDS 50 can request the audit trail buffer contents, and receive the buffer data, over the second network 45 or over another network link, if present. Likewise, the IDS 50 can receive MIB data over the second network 45, or over another network link, if present.

The IDS 50 processes the communicated data to determine whether or not an intrusion attack is underway. By incorporating translation and filtering functionality into the probe 40, the accuracy of intrusion determination is significantly increased, because the probe is designed to capture and process the data flowing to and from the gateway 20. The IDS 50, which may not be otherwise capable of monitoring at such an advantageous network point (e.g., the LAN/WAN link) or separating management traffic from other traffic, can take advantage of the probe's placement in the network and of the probe's filtering capabilities.

In one implementation, the IDS can make use of network performance information that is collected by the probe. Knowledge of the traffic profile, i.e. network statistics relating to protocols, hosts, and conversations, server & client response times, network Quality-of-Service conditions, historical traffic profile, and even actual packet traces, provide additional data points for a security analysts in their endeavor to detect intrusion attacks. For example, if the IDS monitors a network parameter, it can determine when that parameter is outside of a normal, or expected range. Just as one illustrative example, if the number of "pings" on Mondays between 4 and 4:15 PM is typically around 50+/−10, a reading of 200 pings might be indicative of an intruder. Likewise, other information-gathering requests could be indicative of an attempted intrusion. A probe typically can be configured to record the number, duration, and amount of network traffic, and can categorize the traffic by protocols, hosts, and conversations, as well as other information specified in the various MIBs. This information can be made available to the IDS, and can be the basis for predetermined or user-specified alerts or action by the IDS.

Figure 2:
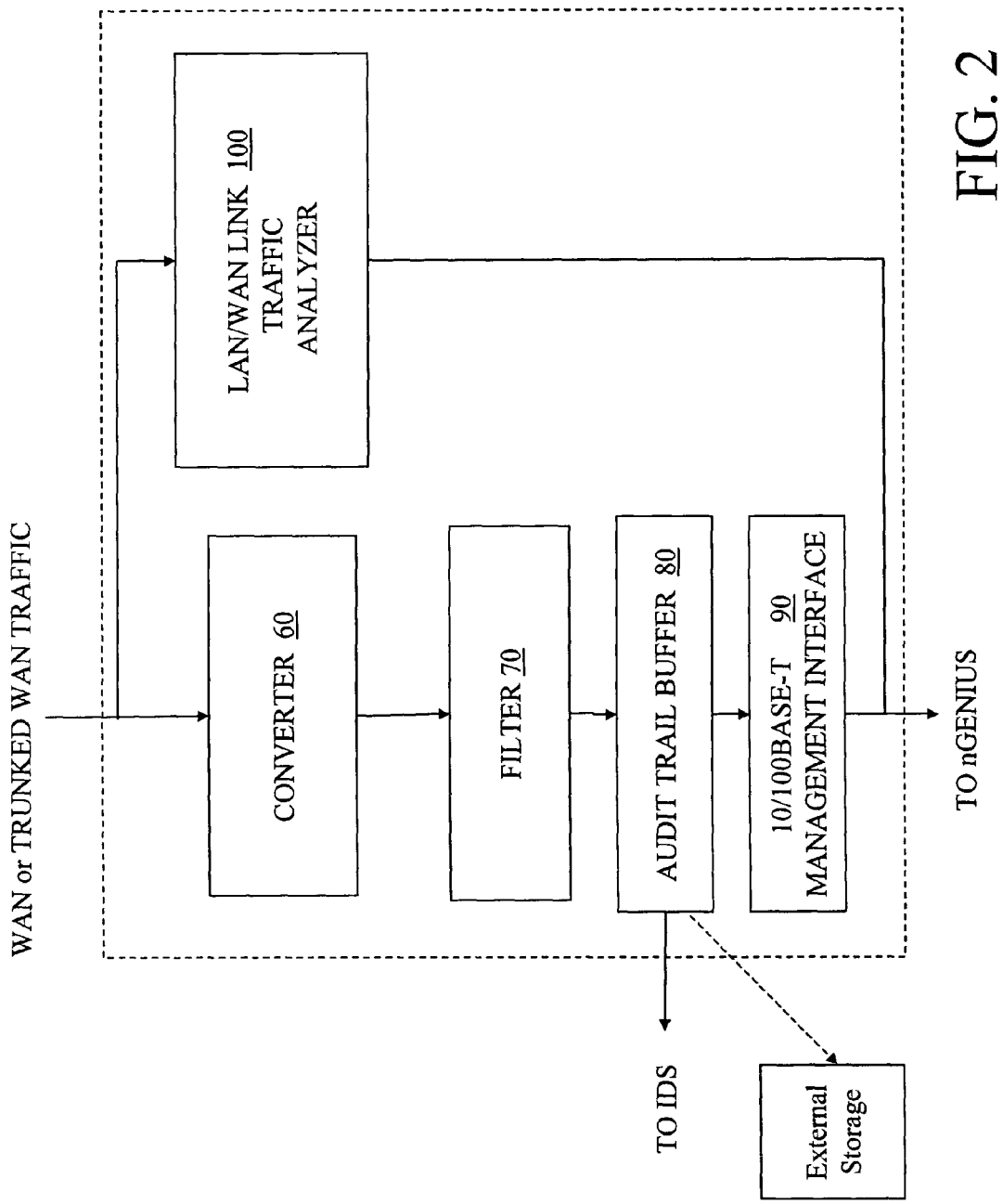
FIG. 2 is a block diagram of a probe in accordance with an embodiment of the invention.

With reference to FIG. 2, in one embodiment, a probe 55 includes hardware and related software to provide the functionality described in more detail below. More specifically, the probe 40 includes a packet converter module 60. The converter module 60 receives LAN/WAN or trunked LAN/WAN traffic. The converter module 60 aggregates the received traffic when trunked traffic is received. Aggregation refers to combining traffic from the various LAN/WAN links such that it appears as though the traffic is coming from a single logical point.

As described above, the probe 55 can include a plurality of NIC cards each connected to a respective LAN/WAN link. Traffic received by each NIC is stored in a local memory location of the probe in the form of a linked list. The converter module 60 converts the LAN/WAN traffic such that it appears to be LAN traffic. This conversion is described in further detail below. Packets from multiple networks can, optionally, be aggregated.

A filter module 70 is in communication with the converter module 60 and receives the converted traffic. The filter module 70 filters the converted traffic to remove traffic that may not be useful to an IDS 50 in determining an intrusion attack. Each packet is reviewed, and if it meets certain predetermined criteria, is not forwarded (i.e., filtered). For example, management traffic may be filtered by a set of pre-defined or user-specified filters. In one embodiment, the filter module is a software module. The processor of the probe 55 executes the filter module 70 to perform the filtering process.

An audit trail buffer 80 is in communication with the filter module 70 and receives the filtered network traffic. (In other embodiments, not shown, the audit trail buffer stores unfiltered traffic.) The audit trail buffer 80 stores the filtered data to provide an expansive record of the converted traffic. As individual frames of network traffic are converted and filtered, they are forwarded to the IDS 50 for analysis. When the IDS 50 detects a possible intrusion attack, the event can be communicated to the probe 55, and the traffic stored in the audit trail buffer 80 can be forwarded to the IDS 50 or other system for further forensic analysis. In one embodiment, the audit trail buffer is an allocated portion of RAM memory of the probe 40. The size of the audit trail buffer 80 also can be programmable by a user, and is typically between 64 kbytes and 1 Gigabyte.

In one embodiment, the contents of the Audit Trail buffer may be fed to an external, permanent storage media so that continuous, 24×7 Network surveillance can be performed. This externally stored data can then analyzed or replayed to further examine Network Activity for a specific time frame in the past. Analysis can be done using existing Applications such as NetScout's nGenius Performance Manager. In addition, if the stored data contains multi-media traffic (e.g., based on Voice-over-IP Protocols), then an external Media Player could be used to extract the relevant information from the stored data and replay the audio/video portion of the traffic. This would provide additional supplementary information that would be very useful for Network Surveillance—especially if the Voice-over-IP (VoIP) components of the Network are being compromised. Using an internal state machine algorithm, the Probe can automatically track all the currently used VoIP Protocols such as H.323, MGCP, SIP, RTP, RTCP, etc., and enhance the quality of information that is externally saved if the traffic-type is VoIP. For example, besides storing the Audio/Video portion of the traffic, other pertinent information such as Phone Numbers, Phone Numbering Plan, IP address, QoS (Quality of Service) parameters, Call Duration, Call Connect and End times, etc will also be encoded in the traffic that is directed to an external Storage Media.

A traffic analyzer module 90 is in communication with the audit trail buffer 80 and receives the filtered and converted network traffic. The traffic analyzer module 90 calculates network performance statistics related to the filtered and converted traffic. The calculated results can be forwarded to, for example, an NGENIUS network management client (NMS). In one embodiment, the traffic analyzer module 90 is a software module that is executed by the processor of the probe 55.

A performance analyzer module 100 also receives the traffic on the first network and, in turn, gathers performance information for the first network. These results can be stored in a management information base (MIB), such as the RMON1 MIB, RMON2 MIB, NetScout's Universal Response Time MIB and VoIP MIB, and the Mini-RMON1 MIB, and also can be forwarded, for example, to a network management client and/or to an IDS. In one embodiment, the performance analyzer module 100 is a software module that is executed by the processor of the probe 55.

Figure 3:
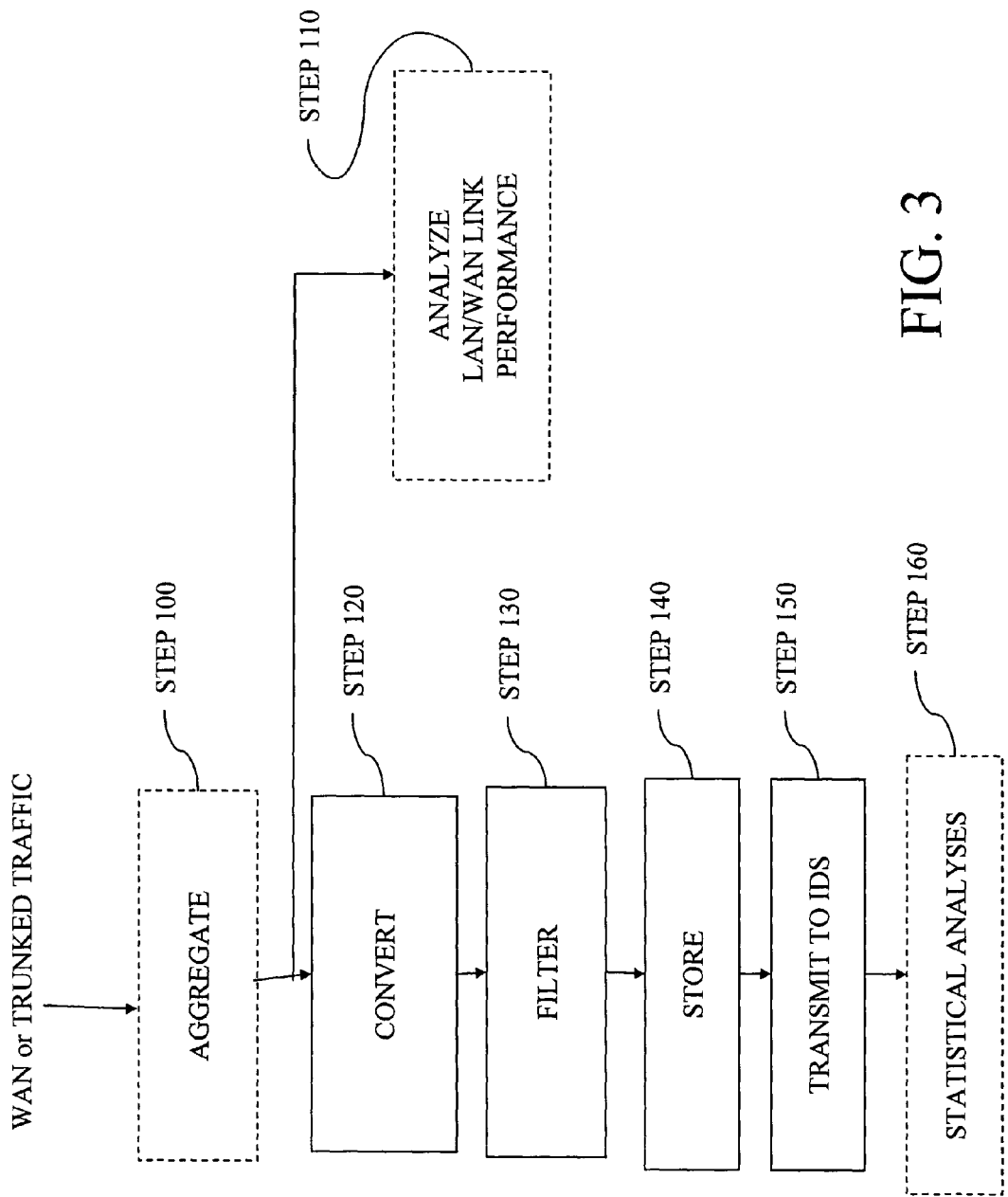
FIG. 3 is a flowchart that depicts the operation of a probe in accordance with an embodiment of the invention.

Although the above functionality is described with reference to specific hardware and software in general, the functionality can be implemented in various ways. With reference to FIG. 3, in one embodiment, a network device, such as a probe, receives traffic from a first network, such as a LAN/WAN link, or from trunked WAN traffic. If trunked traffic is received, the traffic is aggregated, that is, combined such that it appears to emanate from a single logical source (STEP 100). Optionally, the first network traffic can be analyzed (STEP 110) to determine status and performance. The received traffic is converted from the received format into a second network format (STEP 120). For example, various portions of a frame can be removed and new portions added as replacements to, for example, format the frame for a LAN instead of a LAN/WAN link.

The converted data is then filtered (STEP 130). The filtering step is optional and may not be necessary in all implementations. Various filtering techniques can be used, for example, pre-defined software and hardware filters that remove network management traffic can be used. In addition, user-defined (or programmable) software and hardware filters can be used to remove traffic from specific users and or network locations. Typically, the data that is filtered is selected for filtering because it is not useful to an IDS and therefore is removed to increase the performance and accuracy of intrusion detection.

The filtered data can be stored, for example, in an audit trail buffer, as described above. The filtered data is also forwarded to the IDS system (STEP 150) for analysis. Optionally, the filtered data can be analyzed to determine the performance of the network link connecting the probe and the IDS (STEP 160).

Figure 4:
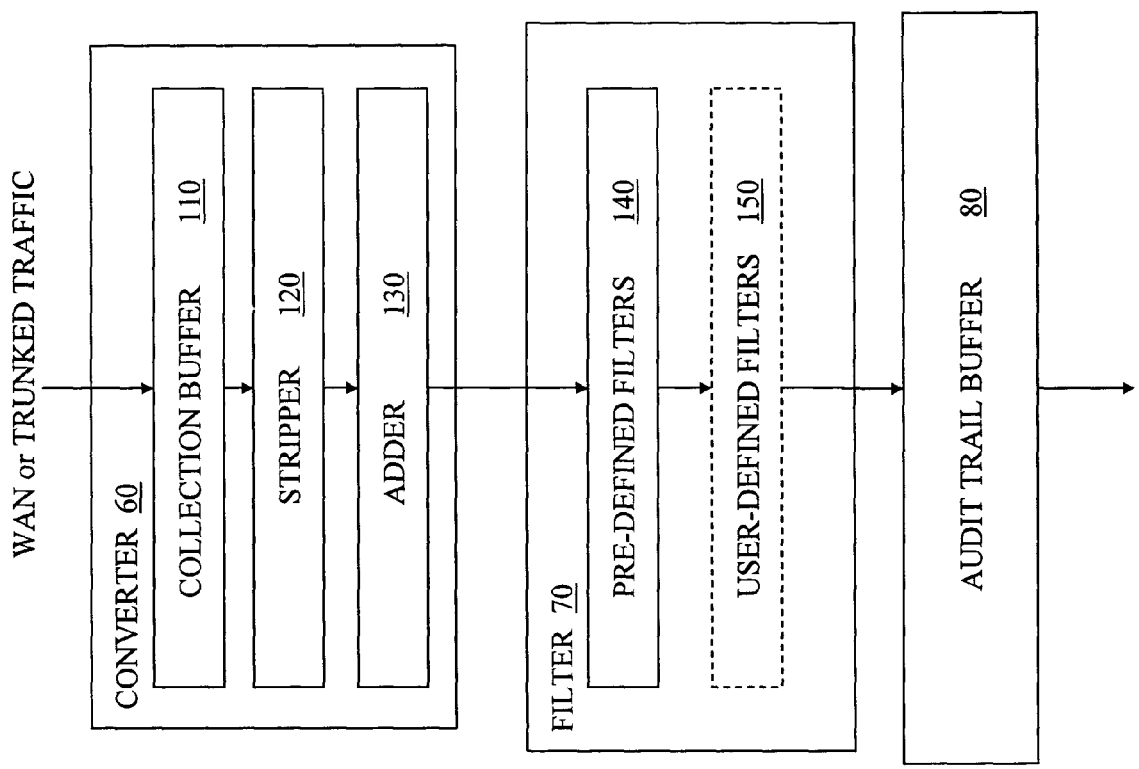
FIG. 4 is a block diagram of a converter module and filter module of FIG. 2 in accordance with an embodiment of the invention.

With reference to FIG. 4, an embodiment of the converter module 60 includes a collection buffer module 110. The collection buffer module 110 receives the traffic from each interface, and stores the data. In one embodiment, the collection buffer module 110 uses the local RAM memory of the probe to store the data. The received traffic is stored as linked lists, with each linked list associated with a network interface. If trunked traffic is received from multiple interfaces, for example, traffic from each link is stored in a respective link list. For example, if the probe is connected to three separate LAN/WAN links, the collection buffer maintains three separate link lists of received traffic, one for each respective LAN/WAN link.

The converter 60 also includes a stripper module 120 in communication with the collection buffer module 110. The stripper module 120 receives network traffic from the collection buffer module 110. The stripper module removes headers originating with the first network (e.g., the WAN header), and removes an encapsulation header if necessary. In one embodiment, the stripper module 120 is a software module that is executed by the processor of the probe 55. The stripper module 120 sequentially accesses the link list(s) in the collection buffer 110. In general, one packet from each link is processed at a time. In other embodiments, for example with multiple processors, multiple packets can be processed in parallel.

The converter further includes an adder module 130 in communication with the stripper module 120. The adder module 130 receives the stripped frames from the stripper module 120 and converts them into traffic suitable for the second network link. For example, the adder 130 can prepend the stripped LAN/WAN traffic with pseudo-MAC headers associated with Ethernet. The headers are referred to as pseudo-MAC headers because the source and destination MAC address are predetermined. In one embodiment, the Ethernet conversion module 130 is implemented in software and executed by the processor of the probe. The Ethernet conversion module 130 processes one packet at a time. In other embodiments, multiple packets can be processed in parallel.

The filter module 70 can include pre-defined filters 140 and, optionally, a set of user-defined filters 150. The filters can utilize predefined sets of criteria to determine whether a packet should be forwarded. For example, the pre-defined filters 140 can be configured to filter traffic that is not useful to the IDS 50 in diagnosing an intrusion attack. For example, management network traffic may be filtered out by the pre-defined filters 140. More specifically, for ATM traffic, F4 OAM, F5 OAM, Flow Control (e.g. RM Cell), UNI 3.x and UNI 4.0 frames can be filtered. User-defined filters 150 can remove additional traffic. These filters can be designed by a system operator to remove, for example, a particular type of packet, or traffic from a specific Internet site or user. The filtered traffic can be stored in the audit trail buffer 90, as described above. In one implementation, the pre-defined filters 140 are software modules that are executed by the processor of the probe, and the user-defined filters 150 are implemented as the same or as a different software module executed by the processor of the probe.

Figure 5:
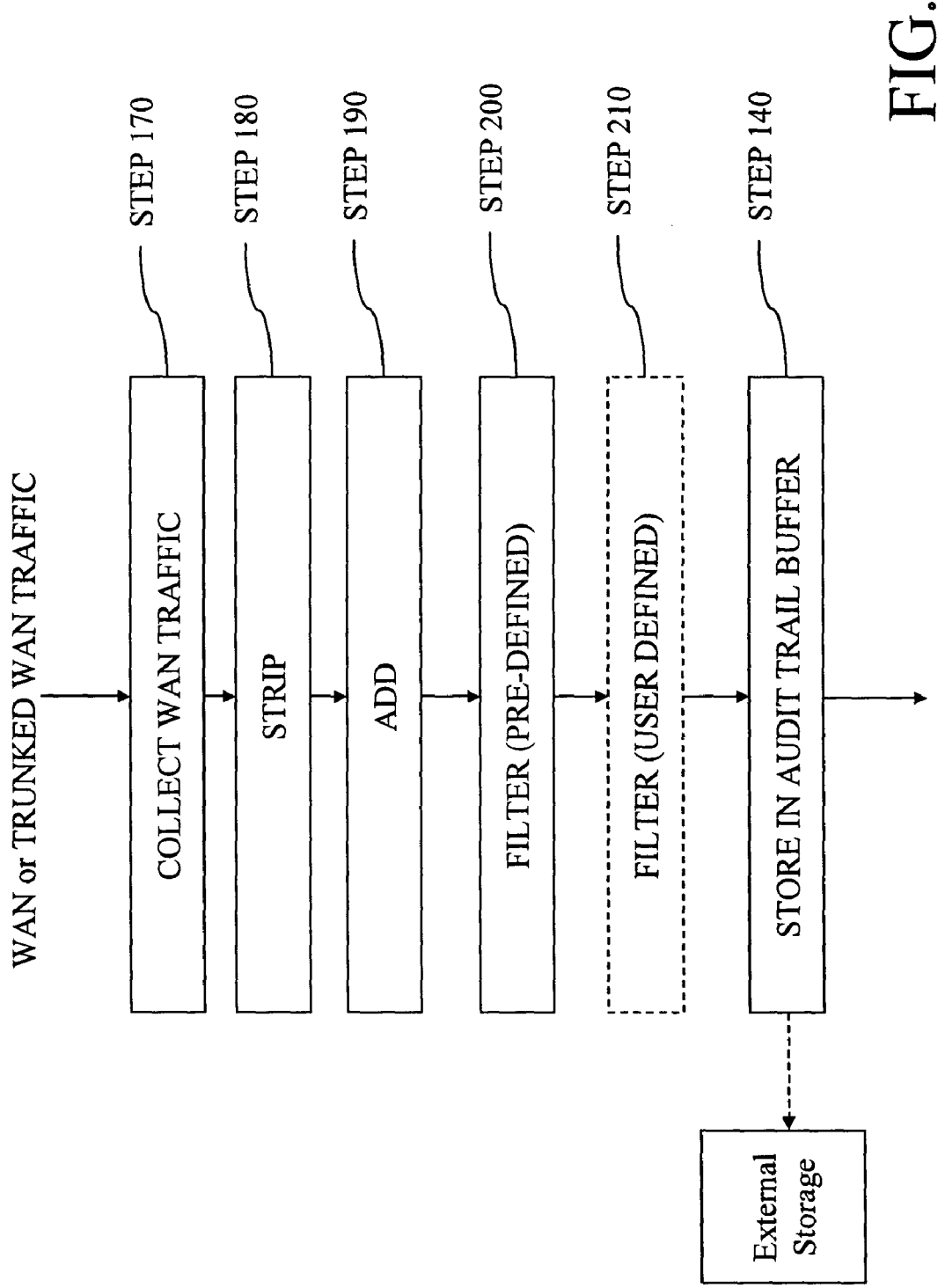
FIG. 5 is a flowchart that depicts a method of probe operation in accordance with an embodiment of the invention.

Although the above functionality is described with reference to particular hardware and software, the functionality can be implemented in various ways. With reference to FIG. 5, in general, traffic received from a first network link (e.g., the LAN/WAN link and/or aggregated links described above) is collected (STEP 170). This can take place in the collection buffer described above or in other data storage. After collection, certain aspects associated with the first network link are removed (STEP 180). For example, if ATM frames are received, the WAN headers are removed from the individual frames. Subsequently, aspects associated with a second network link are added to the stripped frames for communication over the second network link (STEP 190). For example, LAN headers and/or checksums can be added.

After conversion to the format for the second network, the traffic can be filtered by a set of pre-defined filters (STEP 200). The pre-defined filters function can remove traffic not of interest to the IDS system. For example, in an ATM WAN, F4 OAM, F5 OAM, Flow Control (e.g. RM Cell), UNI 3.x and UNI 4.0 frames, PNNI v1.x frames, and encapsulation-specific control frames can be filtered. Optionally, a set of user-defined filters can be used to remove additional traffic (STEP 210). These filters can be programmed by a system user. Once filtered packets are removed, the data is stored (STEP 140), for example, in an audit trail buffer, as described above.

With reference to FIGS. 6A and 6B, in an illustrative example, the first network is a WAN 10 that incorporates an ATM topology utilizing LAN Emulation (LANE) 1.x encapsulation. The second network link is a 100 Base-T Ethernet LAN. The probe 40 monitors the first network, and performs segmentation-assembly-reassembly (SAR) to convert ATM cells into frames. Each frame is stored the collection buffer 110 prior to conversion to Ethernet format. A typical frame is shown in FIG. 6A. The frame includes a LANE header 200, a Native Ethernet Destination Address 201, a Native Ethernet Source Address 202, the Ethertype 203, data payload 204 and a Cyclic Redundancy Check (CRC32) 205.

After collection, each frame stored in the collection buffer 110 is stripped of the WAN header and also the encapsulation header, if necessary. The WAN header format depends on the underlying physical media and the encapsulation used; therefore, depending on configuration, the probe can remove the header elements accordingly. After removing the LANE header 200, the Native Ethernet Destination Address 201, and the Native Ethernet Source Address 202, the probe prepends the frame with a pseudo-MAC header. For example, an inbound frame can be prepended with a predetermined destination MAC address 210, such as, 00-80-8c-55-55-55 and a predetermined source address 211, such as, 00-80-8c-AA-AA-AA. An outbound frame can be prepended with the opposite source 211 and destination 210 address. In this way, the packets on the link will appear to be communicated between two nodes. Additionally, a new checksum 215 is calculated.

Note that because FIGS. 1 through 5 are block diagrams, the enumerated items are shown as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signals embodied in one or more of a computer disk (magnetic, or optical (e.g., CD or DVD), or both), non-volatile memory, tape, a system memory, and a computer hard drive.

From the foregoing, it will be appreciated that the system and method of detecting network intrusions afford a simple and effective way to monitor network performance and integrity. Embodiments of the invention are able to interact seamlessly with the network, sense network conditions, ascertain network performance, and identify instances of potential intrusion. A system and method according to the invention minimizes instances of over- and under-detection, thereby increasing efficiency and accuracy.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for detecting an intrusion initiated in a first network toward a second network, comprising:

receiving, at a probe located outside the second network, data packets communicated over a first network link which transmits, from the first network to the second network, the data packets in a format suitable for the first network;

converting the received data packets received at the probe into a format suitable for an intrusion detection system (IDS) for detecting the intrusion initiated in the first network toward the second network, the IDS located outside the second network and configured to not receive data packets exchanged inside the second network;

monitoring, by the probe, the data packets received at the probe to evaluate network performance of the first network link;

collecting, by the probe, current network performance data based on the network performance;

updating, by the probe, historical network performance information with the current network performance data; and transmitting, by the probe over a second network link to the IDS the converted data packets and the updated historical network performance information, wherein at least one of the converted data packets and the updated historical network performance information is used by the IDS to detect the intrusion.

2. The method of claim 1 wherein the first network includes a wide area network and the second network includes a local area network.

3. The method of claim 1 wherein the method further comprises receiving, at the probe, data packets communicated over a third network link which transmits, from the first network to the second network, data packets in a format suitable for the first network.

4. The method of claim 3, further comprising the step of aggregating the data packets received over the first network link and the data packets received over the third network link, wherein the aggregated data packet appears to emanate from a single logical source.

5. The method of claim 1 wherein the first network link operates using at least one HSSI protocol, T1 protocol, E1 protocol, ATM protocol, Packet-Over Sonet/SDH protocol, Frame-DS3 protocol, 1G Ethernet protocol, and 10G Ethernet protocol.

6. The method of claim 1 wherein the first network link comprises a protocol that encapsulates data traffic.

7. The method of claim 6 wherein the protocol comprises at least one of MPLS protocol, GMPLS protocol, VLAN (802.1q) protocol, HSSI protocol, T1 protocol, E1 protocol, ATM protocol, Packet-Over Sonet/SDH protocol, Frame-DS3 protocol, 1G Ethernet protocol, and 10G Ethernet protocol.

8. The method of claim 1, further comprising the step of maintaining, by the probe, an audit trail buffer for forensic analysis.

9. The method of claim 8 wherein the audit trail buffer comprises a memory for recording monitored data packets.

10. The method of claim 3, further comprising the step of maintaining, by the probe, an audit trail buffer for forensic analysis, wherein the audit trail buffer comprises a memory for recording monitored data packets and wherein the memory records data packets from at least one of the first network link and the third network link.

11. The method of claim 8, further comprising the steps of: receiving, by the probe, an event notification; and upon receipt of the event notification, communicating, by the probe, current contents of the audit trail buffer.

12. The method of claim 1, wherein the converting step comprises:
storing the data packets received at the probe in a collection buffer;
stripping header information associated with a protocol of the first network link; and
adding header information associated with a protocol of the second network link.

13. The method of claim 12, wherein the step of storing comprises storing data packets received from at least one of the first network link and a third network link.

14. The method of claim 12 wherein:
the stripping step further comprises stripping checksum information associated with the protocol of the first network link; and
the adding step further comprises adding checksum information associated with the protocol of the second network link.

15. The method of claim 13, the step of stripping comprising stripping at least one of a Layer 2 MAC header, an Ethernet source address, and an Ethernet destination address.

16. A network performance probe system for detecting an intrusion initiated in a first network toward a second network, the probe system comprising:
a first network interface for receiving data packets communicated over a first network link which transmits, from the first network to the second network, the data packets in a format suitable for the first network, wherein the probe is located outside the second network;
a packet converter for converting the data packets received at the first network link into a format suitable for an intrusion detection system (IDS) for detecting the intrusion initiated in the first network toward the second network, the IDS located outside the second network and configured to not receive data packets exchanged inside the second network;
a protocol for collecting current network performance data related to the first network link and updating historical network performance information with the current network performance data; and
a second network interface for communicating, over a second network link to the IDS, the converted data packets and the updated historical network performance information, wherein at least one of the the converted data packets and the updated historical network performance information is used by the IDS to detect the intrusion.

17. The network performance probe system of claim 16 further comprising a third network interface for receiving data packets communicated over a third network link which transmits, from the first network to the second network, data packets in a format suitable for the first network.

18. The network performance probe system of claim 17 further comprising an aggregator for aggregating the data packets from the first network link and the data packets from the third network link, wherein the aggregated data packet appears to emanate from a single logical source.

19. The network performance probe system of claim 16 wherein the first network comprises a wide area network and the second network comprises an Ethernet network.

20. The network performance probe system of claim 16 wherein the first network link operates using at least one HSSI protocol, T1 protocol, E1 protocol, ATM, Packet-Over Sonet/SDH protocol, Frame-DS3 protocol, and 10G Ethernet protocol.

21. The network performance probe system of claim 16 wherein the first network link comprises a protocol that encapsulates data traffic.

22. The network performance probe system of claim 21 wherein the protocol comprises at least one of MPLS protocol, GMPLS protocol, VLAN (802.1q) protocol, HSSI protocol, T1 protocol, E1 protocol, ATM protocol, Packet-Over Sonet/SDH protocol, Frame-DS3 protocol, 1G Ethernet protocol, and 10G Ethernet protocol.

23. The network performance probe system of claim 16, further comprising a performance analyzer for acquiring network performance data in response to the data packets received at the first network link over the first network link.

24. The network performance probe system of claim 16, further comprising an audit trail buffer maintainable for forensic analysis.

25. The network performance probe system of claim 24 wherein the audit trail buffer comprises a memory for recording data packets received at the first network link for forensic analysis.

26. The network performance probe system of claim 25, further comprising an event notification receiver for causing, upon receipt of an event notification, a communication of the current contents of the audit trail buffer.

27. The network performance probe system of claim 16, wherein the converter comprises:
 a collection buffer for storing data packets received at the first network link;
 a stripper for stripping header information associated with a protocol of the first network link; and
 an adder for adding header information associated with a protocol of the second network link.

28. An article of manufacture comprising a computer program storage medium having computer readable program code embodied therein for detecting an intrusion initiated in a first network toward a second network, the computer readable program code in the article of manufacture including:
 computer readable code for causing a computer to receive, at a probe located outside the second network, data packets communicated over a first network link which transmits, from the first network to the second network, the data packets in a format suitable for the first network;
 computer readable code for causing a computer to convert the received data packets into a format suitable for an intrusion detection system (IDS) for detecting the intrusion initiated in the first network toward the second network, the IDS located outside the second network, and configured to not receive data packets exchanged inside the second network;
 computer readable code for causing a computer to monitor, via the probe, the received data packets to evaluate network performance of the first network link;
 computer readable code for causing a computer to collect current network performance data based on the network performance;
 computer readable code for causing a computer to update historical network performance information with the current network performance data; and
 computer readable code for causing a computer to transmit, via the probe over a second network link to the IDS, the converted data packets and the updated historical network performance information, wherein at least one of the converted data packets and the updated historical network performance information is used by the IDS to detect the intrusion.

29. The article of manufacture of claim 28 wherein the computer program storage medium comprises at least one of a computer magnetic disk, a computer optical disk, a tape, a non-volatile memory, a system memory, and a computer hard drive.

30. A computer program storage medium readable by a computer, embodying a computer program of instructions executable by the computer to perform method steps for detecting an intrusion initiated in a first network toward a second network, the method steps comprising:
 receiving, at a probe located outside the second network, data packets communicated over a first network link which transmits, from the first network to the second network, the data packets in a format suitable for the first network;
 converting the data packets received at the probe into a format suitable for an intrusion detection system (IDS) for detecting the intrusion initiated in the first network toward the second network, the IDS located outside the second network and configured to not receive data packets exchanged inside the second network;
 monitoring, by the probe, the data packets received at the probe to evaluate network performance of the first network link;
 collecting, by the probe, current network performance data based on the network performance;
 updating, by the probe, historical network performance information with the current network performance data; and
 transmitting, by the probe over a second network link to the IDS, the converted data packets and the updated historical network performance information, wherein at least one of the converted data packets and the updated historical network performance information is used by the IDS to detect the intrusion.

31. The computer program storage medium of claim 30 further comprising at least one of a computer magnetic disk, a computer optical disk, a tape, a non-volatile memory, a system memory, and a computer hard drive.

32. The method of claim 1, wherein the historical network performance information comprises an historical traffic profile.

33. The method of claim 1, wherein the intrusion detection system uses the historical network performance information as a basis for an action.

34. The network performance probe system of claim 16, wherein the historical network performance information comprises a historical traffic profile.

35. The network performance probe system of claim 16, wherein the intrusion detection system uses the historical network performance information as a basis for an action.

36. The method of claim 1, wherein the format suitable for the IDS is a format suitable for the second network.

37. The network performance probe system of claim 16, wherein the format suitable for the IDS is a format suitable for the second network.

38. The method of claim 1 further comprising, prior to transmitting over the second network link, filtering a subset of the converted data packets.

39. The method of claim 38, wherein the filtering comprises filtering based on predetermined criteria or user-defined criteria.

40. The network performance probe system of claim 16, further comprising a filter for filtering a subset of the converted data packets prior to communicating, over the second network link to the IDS, the converted data packets and the updated historical network performance information.

41. The network performance probe system of claim 40, wherein the filtering of the subset of the converted data packets is based at least in part on predetermined criteria or user defined criteria.

* * * * *

UNITED STATES PATENT AND TRADEMARK OFFICE
CERTIFICATE OF CORRECTION

| | |
|---|---|
| PATENT NO. | : 7,587,762 B2 |
| APPLICATION NO. | : 10/637431 |
| DATED | : September 8, 2009 |
| INVENTOR(S) | : Anil Singhal et al. |

It is certified that error appears in the above-identified patent and that said Letters Patent is hereby corrected as shown below:

On the title page, item (57), line 2, "such a" should read --such as a--.

In claim 16, column 12, line 38, "of the the converted" should read --of the converted--.

Signed and Sealed this

Third Day of November, 2009

David J. Kappos
*Director of the United States Patent and Trademark Office*